Figure 1:
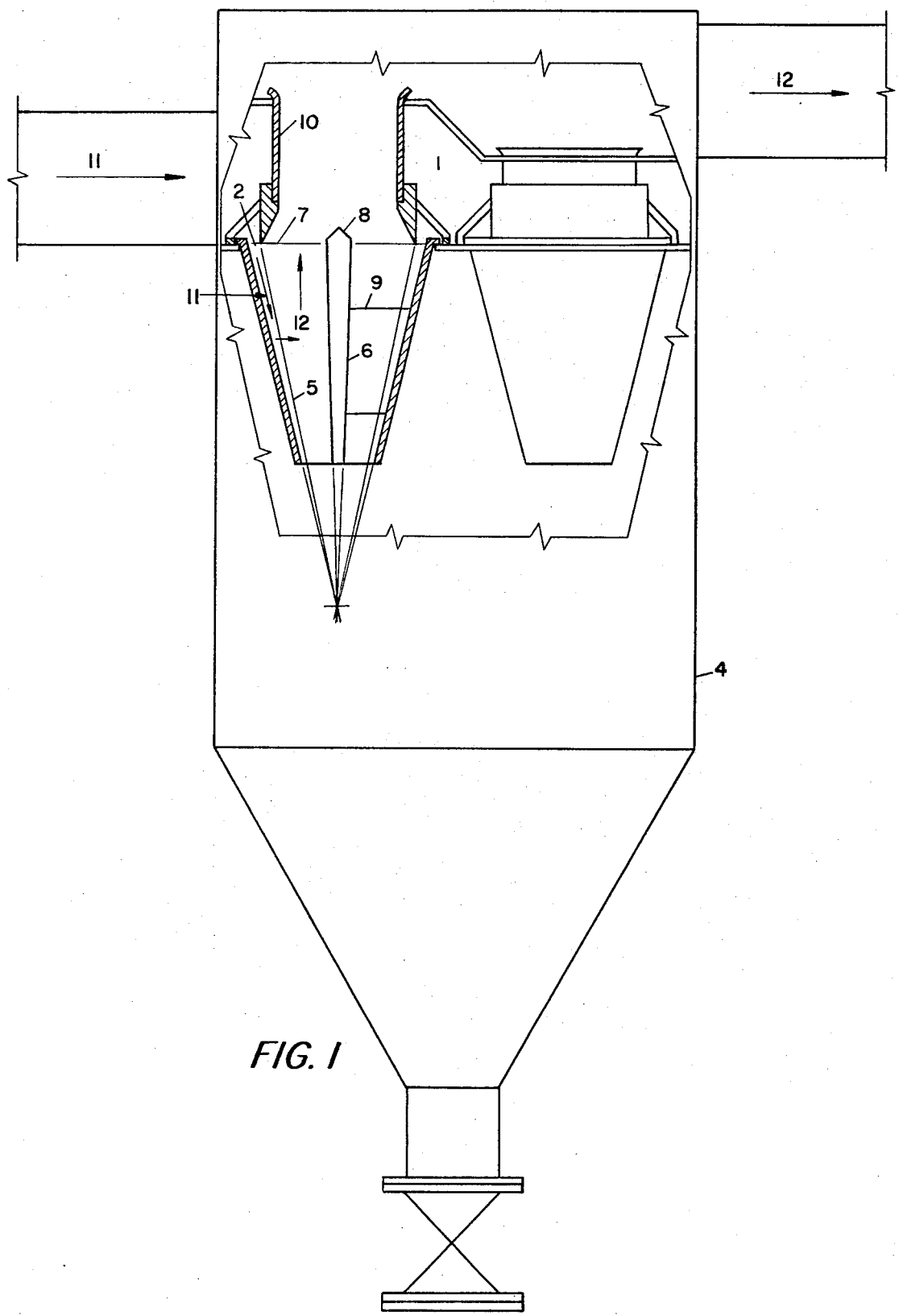

United States Patent
Knierim

[15] 3,691,735
[45] Sept. 19, 1972

[54] MINI-MICRON PARTICLE SEPARATION SYSTEM

[72] Inventor: Vincent L. Knierim, 1420 Linville St., Kingsport, Tenn. 37664

[22] Filed: Oct. 23, 1970

[21] Appl. No.: 83,590

[52] U.S. Cl. ..................55/391, 55/395, 55/414, 55/434
[51] Int. Cl. .............................................B01d 45/06
[58] Field of Search......55/1, 17, 270, 342, 345–349, 55/391, 392, 394–399, 413–416, 434, 461; 209/140, 141

[56] References Cited

UNITED STATES PATENTS

| | | | |
|---|---|---|---|
| 1,818,905 | 8/1931 | McGee | 55/345 |
| 3,061,994 | 11/1962 | Myltins | 55/346 |

FOREIGN PATENTS OR APPLICATIONS

| | | | |
|---|---|---|---|
| 926,647 | 4/1955 | Germany | 55/416 |
| 406,425 | 3/1934 | Great Britain | 55/416 |
| 71,064 | 1/1916 | Austria | 55/391 |

Primary Examiner—Bernard Nozick

[57] ABSTRACT

A highly effective very small particle separation system comprising a single or multiple unit arrangements of elements for controlling the flow and relative velocities of a contaminated gas stream adjacent to a clean gas stream effecting a high degree of efficiency of separation of very small sized particulate matter from the contaminated gas stream.

1 Claims, 2 Drawing Figures

MINI-MICRON PARTICLE SEPARATION SYSTEM

This invention concerns a novel separation system for the removal of very small sized particulate matter from a contaminated gas stream. Present cyclonic type separation systems have very low efficiencies in the range of 10 micron diameter particles and less, contributing to considerable atmospheric air pollution. A significant reduction in atmospheric air pollution can be accomplished by replacement of the cyclonic elements with elements of this invention. A significant saving in elapsed time and capital expenditure, to reduce pollution can be accomplished versus the installation of electrical precipitators.

Objectives, therefore of the present invention are:

1. To provide a highly efficient small particle mechanical separation system for any contaminated gas stream discharging to a process or the atmosphere for recovery of the particulate matter or the reduction of pollution of the gas to process or atmosphere.

2. To provide separation elements of a higher order of efficiency for small sized particulate matter for replacement of cyclonic elements to accomplish significant reduction of atmospheric air pollution with a minimum of elapsed time and capital expenditure.

3. To provide said separation in a structural form and arrangement which lends itself to practical manufacturing and installation processes and apparatus, and which is adapted for use with the conventional forms of ductwork, dampers, hoppers circulating fans and any associated items, including special metals, plastics and alloys for corrosion protection, in general use on particle separation systems.

These and other objectives hereinafter appearing have been obtained in accordance with the present invention through the discovery that high particle separation efficiency can be attained by controlling the velocity of an upward flowing clean gas stream in conjunction with controlling the velocity of an adjacent downward flowing contaminated gas stream thereby providing a low velocity horizontal flow from the contaminated gas stream through an inclined interface to the clean gas stream at a velocity insufficient to traverse particulate matter the horizontal distance to the interface in the interval of time the particle traverses the distance from the inlet orifice to the discharge opening to the particle storage hopper.

Figure 2:
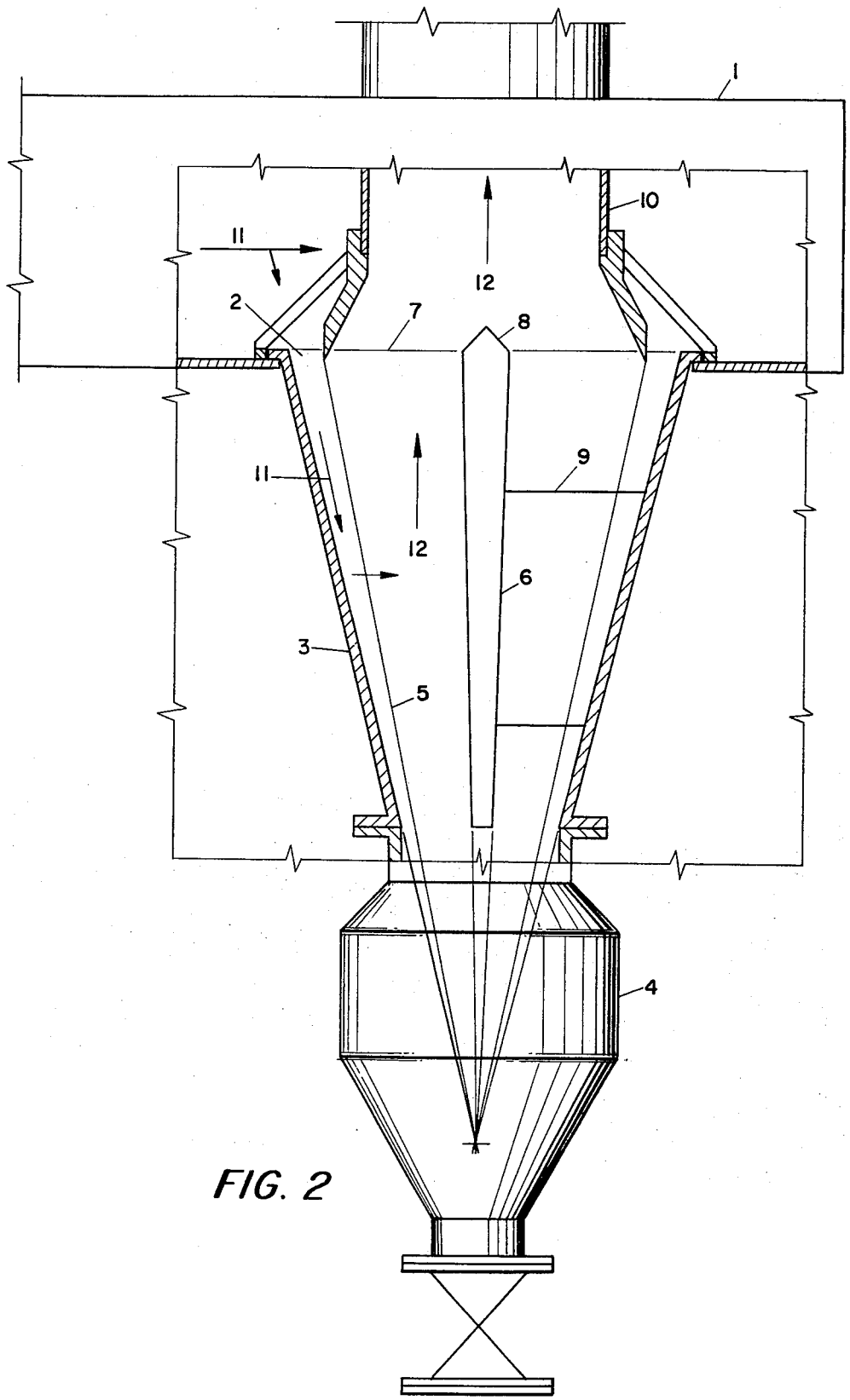

A more complete understanding of the invention may be had from the following description and drawing wherein:

FIG. 1 is a partially cross sectional representation of an existing multiple cyclone separation system with elements of the present invention replacing the cyclones, and FIG. 2 is a partially cross sectional representation of a single element separation system of the present invention.

Referring to FIG. 1 of the drawing multiple elements of the invention are demonstrated as installed in existing multiple cyclone dust collectors currently in use on many power plants and other applications, as a replacement for the existing cyclonic elements.

Referring to FIG. 2 of the drawing a single element of the invention is demonstrated. Such a unit would be suitable for medium sized applications including incinerators, foundries, smelters, small boilers, sawdust collection and many others presently contributing to atmospheric air pollution, and where installation of electrical precipitators is not economically feasible.

Referring to FIG. 2 of the drawing the invention comprises a cast or sheet metal hood 1 with a suitable opening for receiving a contaminated gas stream 11 for delivery to the particle separator. The hood 1 discharges the contaminated gas stream 11 through a cast metal orfice 2 vertically downward into a cast or sheet metal conical housing 3 with the outside of the periphery of the orifice flush with the inside surface of the housing. The velocity of the contaminated gas stream 11 decreases as it flows downward from the orifice to the bottom of the separator. The bottom of the separator is provided with an opening for the discharge of separated particulate matter into a closed separated particle storage hopper 4. A portion of the velocity pressure of the contaminated gas stream 11 gradually increases the static pressure of the gas as it flows from the orifice to the bottom of the separator. The contaminated gas stream 11 also flows horizontally toward the upward flowing clean gas stream 12 in accordance with the difference in static pressure between the two streams and across the interface 5. The interface 5 is a conical surface with the base flush with the inner circumference of the contaminated gas inlet orifice and the apex at the same location as the apex of the inner surface of the conical housing 3.

The upward flowing clean gas stream 12 is bounded by the interface surface on the outside and a cast or sheet metal core on the inside from the bottom of the separator to the clean stream discharge orifice 7 which is level with the inlet orifice 2. The core is proportioned to provide a substantially uniform static pressure difference between the downward flowing contaminated and the upward flowing clean gas streams resulting in a horizontal gas flow velocity of insufficient magnitude to migrate particulate matter through the interface before arrival at the bottom of the separator and deposition in the particulate matter storage hopper 4.

The cast or sheet metal core 6 is the frustum of a right circular core with the base flush with the inner circumference of the clean gas discharge orifice 7 and the apex at the same location as the apex of the inner surface of the housing 3 and the interface surface. The core 6 shall be provided with a conical extension 8 from the discharge orifice into the discharge duct for the reduction of eddy currents and pressure drop. The core 6 shall be provided with three fins 9, 120° opposed for support and accurate location of the core on the centerline of the unit and at the correct elevation.

The cast metal orifice 2 is provided with a connection for the clean gas stream discharging through orifice 7. A metal tube 10 is provided to conduct the clean gas stream through the contaminated gas stream supply hood 1 to the clean gas stream ductwork for delivery to process or disposal to the atmosphere or other means.

It will of course be appreciated by those skilled in the art that this system will provide consistently high efficiency of particulate matter separation from contaminated gas streams over a wide range of gas stream velocities and therefore would be suitable for installations subject to wide capacity fluctuations without loss of efficiency.

The invention has been described in detail with particular reference to certain shape factors and embodiments thereof, but it will be understood that variations and modifications can be effected within the spirit and scope of the invention described hereinabove.

I claim:

1. A contaminant gas stream separator comprising a narrow unobstructed annular inlet orifice bounded on the outside by an axial downwardly and inwardly tapering frusto-conical housing and on the inside by a coaxial outlet tube having an outer cylindrical division wall portion, a hood connected to the outer diameter of the frustoconical housing having an inlet in communication with said inlet orifice and an outlet in communication with said outlet tube, a coaxially located core being the frustrum of a right circular cone, the shape of the core and frustoconical housing projects an apex having a common point, the base of the core being located at the same level as the inlet orifice defining an annular outlet orifice with the division wall portion a conical cap superposed on the base of the frustrum extending into the tube to provide smooth velocity transition between the outlet orifice and clean gas discharge cylinder, a closed particulate matter storage hopper connected to the bottom of the frusto conical housing having means for removal of particulate material.

* * * * *